C. F. GARMAN.
FRUIT CUTTER.
APPLICATION FILED AUG. 31, 1921.
1,421,207.
Patented June 27, 1922.
2 SHEETS—SHEET 1.
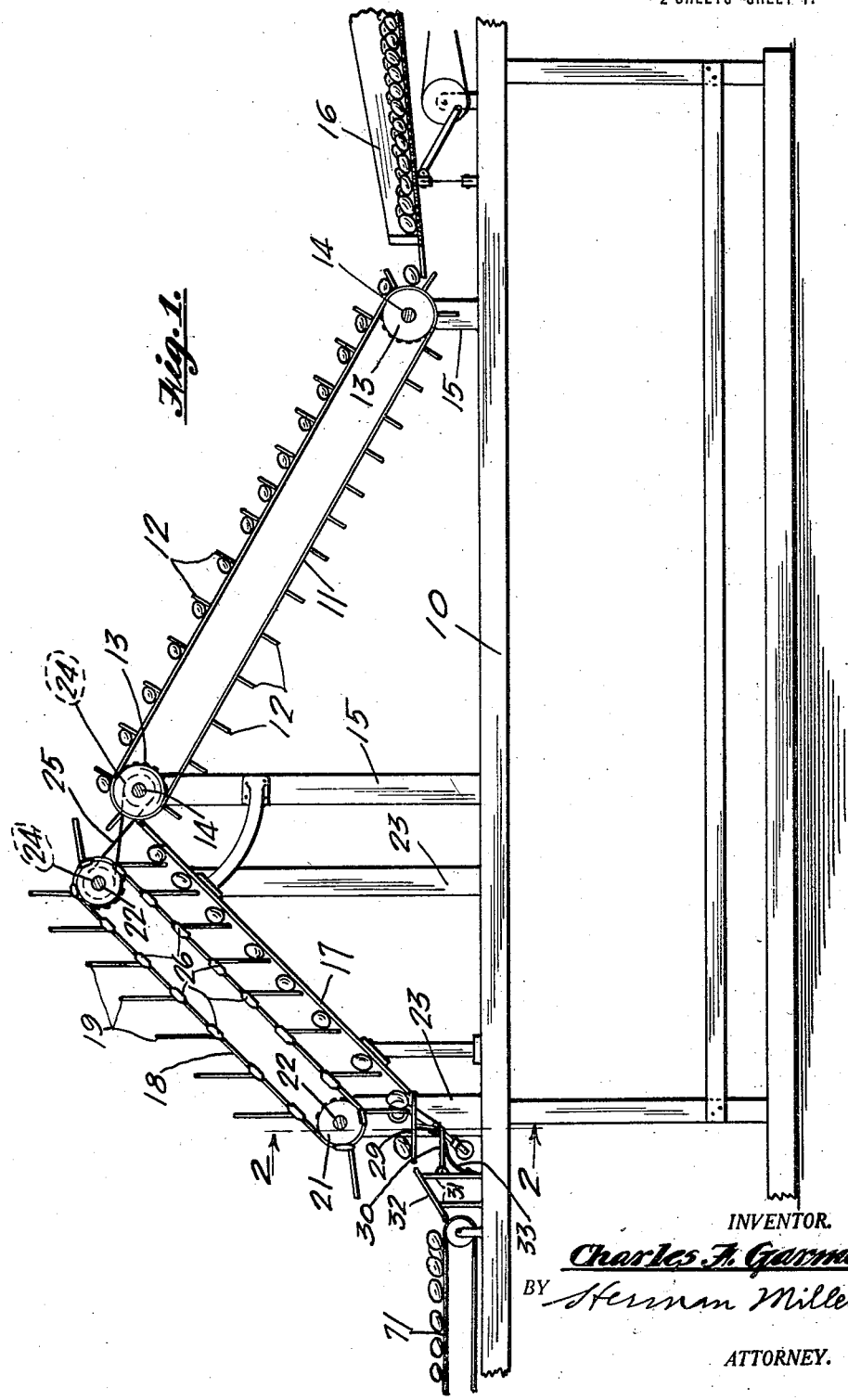
INVENTOR.
Charles F. Garman
BY Herman Miller
ATTORNEY.

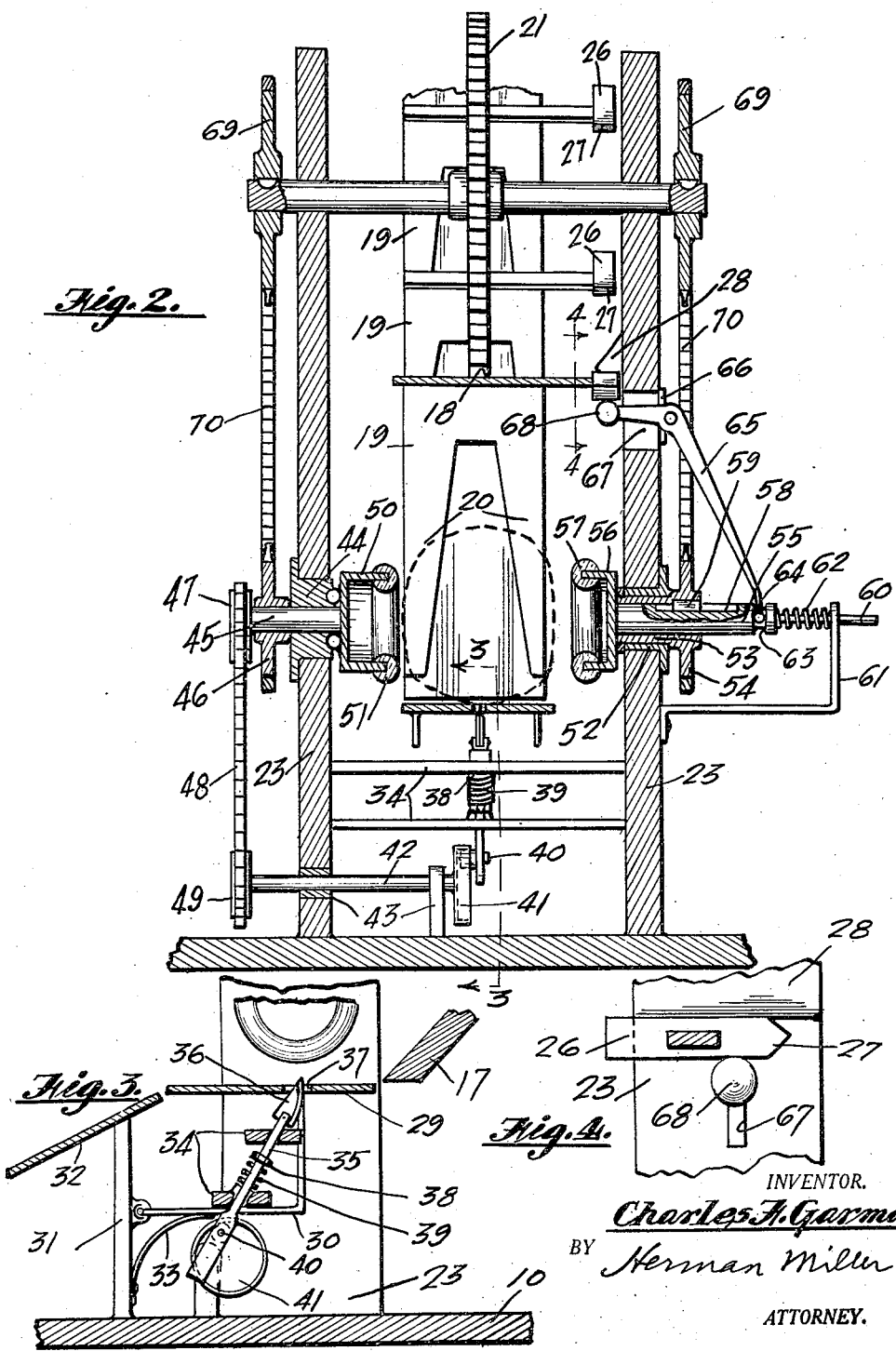

UNITED STATES PATENT OFFICE.

CHARLES F. GARMAN, OF VENTURA, CALIFORNIA.

FRUIT CUTTER.

1,421,207.  Specification of Letters Patent. Patented June 27, 1922.

Application filed August 31, 1921. Serial No. 497,339.

*To all whom it may concern:*

Be it known that I, CHARLES F. GARMAN, a citizen of the United States, residing at Ventura, in the county of Ventura and State of California, have invented new and useful Improvements in Fruit Cutters, of which the following is a specification.

My invention relates to a fruit cutter, the principal object of my invention being to provide a relatively simple, practical and efficient machine that may be economically employed for the relatively rapid cutting or splitting of fruit, such as apricots, peaches and the like.

Further objects of my invention are to provide a fruit cutting or splitting machine that may be easily and cheaply produced, which will handle, within a given time, a relatively large quantity of fruit; and further, to provide a machine that is entirely automatic in operation.

With the foregoing and other object in view, my invention consists in certain novel features of construction and arrangement of parts that will be hereinafter more fully described and claimed, and illustrated in the accompanying drawings, in which—

Figure 1 is a vertical section taken lengthwise through the center of a fruit cutting or splitting machine of my improved construction.

Fig. 2 is an enlarged vertical section taken on the line 2—2 of Fig. 1.

Fig. 3 is a cross section taken on the line 3—3 of Fig. 2.

Fig. 4 is an enlarged detail section taken on the line 4—4 of Fig. 2.

Referring by numerals to the accompanying drawings, which illustrate a practical embodiment of my invention, 10 designates a table that serves as a support for the operating parts of the machine, and arranged above said table is an inclined endless conveyor comprising a belt 11, from which projects a series of short wings 12, and which latter serve as carriers for the fruit that is to be cut or split. The belt 11 is arranged for operation upon drums 13, the trunnions 14 of which are journalled in suitable bearings that are provided at the upper ends of standards 15. A reciprocating or shaker table 16 is arranged to deliver fruit on to the lower end of the endless conveyor, said reciprocating table being supported and operated in any suitable manner.

Leading downwardly from the upper end of the inclined conveyor 11 is an inclined plate or table 17, over which the fruit passes after discharging from the upper end of said conveyor, and arranged for operation above said inclined plate or table is an inclined conveyor, comprising a belt 18 that carries a series of outwardly projecting fruit-engaging plates 19, each of which is bifurcated to form a pair of fingers 20. Belt 18 is mounted for operation on drums 21 having trunnions 22 that are journalled in suitable bearings at the upper ends of standards 23. The trunnion for the upper one of the drums 13 and the trunnion for the upper one of the drums 22 is provided with small pulleys 24 that are connected by a crossed belt 25, so that the endless conveyor comprising the parts 18 and 19 is operated directly from the conveyor comprising the parts 11 and 12, and the latter may be driven in any suitable manner, preferably by power applied to the trunnion 14 and the lower drum 13.

Secured to one side of the endless belt 18 and directly opposite the inner end of each plate 19 is an elongated block 26 having a pointed forward end 27, and these blocks are adapted to ride beneath a lug or projection 28 that extends inwardly from the adjacent upright member 23.

Arranged immediately beneath the lower end of the inclined plate 17 and below the lowermost drum 21 is a horizontally disposed vertically movable plate 29 that performs the functions of a cutting table, in that the fruit is cut or split while positioned upon said plate, and supporting said plate or table is a pair of L-shaped arms 30, the ends of the horizontal legs of which are hinged to a standard 31 that serves as a support for an inclined plate 32 that leads downwardly from the rear edge of said cutting plate or table.

Bearing against the under sides of the horizontal legs of the L-shaped members 30 are the free ends of relatively light springs 33 which normally retain the cutting table in position between the upper edge of the inclined plate 32 and the lower edge of inclined plate 17.

Arranged beneath the cutting table and supported by the adjacent standards 23 is a pair of cross bars 34, one arranged slightly above the other, and operating through apertures formed therein is a rod 35, the upper end of which carries a pointed blade 36 that operates through a slot 37 in the cutting table 29. Arranged on rod 35 is a collar 38 against which bears the upper end of an expansive coil spring 39, the lower end of the latter bearing against the lower cross bar 34, and which arrangement normally forces the blade-bearing rod upwardly. The lower end of rod 35 is pivotally arranged on a wrist pin 40 that projects from a disc 41, and the latter being carried by the inner end of the shaft 42 that is journaled in suitable bearings 43.

Mounted for rotation in a bearing 44 that is formed on one of the standards 23 is a shaft 45, the outer end of which carries sprocket wheels 46 and 47, and arranged for operation on the sprocket wheel 47 is a chain 48 that passes around a sprocket wheel 49 that is fixed on the outer end of shaft 42.

The inner end of shaft 45 carries a cup 50, the inner edge of which carries a fruit-engaging ring 51 of rubber or analogous material. This cup is positioned immediately to the side of cutting table 29 and to the side of and above the point of the blade 36.

Arranged on the opposite standard 23 and directly opposite bearing 44 is a bearing 52, in which is arranged for rotation a tubular hub 53 of a sprocket wheel 54, and journaled for rotation within said tubular hub is a shaft 55 carrying on its inner end a cup 56 that is a counterpart of the cup 50, and said cup 56 bearing on its inner edge a ring 57 of rubber or analogous material. Shaft 55 is provided with a longitudinally disposed slot 58 into which projects a key or feather 59 that is carried by sprocket wheel 54.

Carried by shaft 55 is an outwardly projecting axially disposed rod 60, the outer portion of which is arranged for sliding movement through a bracket 61, and arranged on said rod between said bracket and the end of the shaft is an expansive coil spring 62. The outer portion of shaft 55 is provided with a groove 63, in which engages the bifurcated lower end 64 of a bell crank 65, which latter is fulcrumed on a bracket 66 on the adjacent standard 23, and the short horizontally disposed arm of said bell crank projects through the slot 67 in the adjacent standard, and carries on its inner end a head 68 that is adapted to be engaged by the elongated blocks 26 that are carried by the conveyor belt 18.

Mounted on the trunnions 22 that carry the lower drum 21 are sprocket wheels 69 that are in vertical alinement with the sprocket wheels 46 and 54, and operating upon the respective pairs of sprocket wheels are sprocket chains 70. Arranged below the lower end of inclined plate 32 is a horizontally disposed endless conveyor 71 that receives the parts of the fruit after the same has been divided by the cutting blade 36.

The operation of my improved fruit splitting or cutting machine is as follows:

The fruit is delivered from the reciprocating table 16 to the lower end of the endless carrier that is provided with the projecting wings or members 12, the feeding arrangement being such that one apricot or peach is delivered onto each wing or projection 12. The fruit is carried to the upper end of the endless conveyor that operates on the drums 13 and said fruit is delivered onto the inclined plate 17 with one apricot or peach positioned immediately behind each bifurcated plate 19. As hereinbefore stated, the endless conveyor comprising the parts 10 and 12 may be operated in any suitable manner and the endless conveyor comprising the parts 18 and 19 will be simultaneously operated through the driving connections 24 and 25. Just before each depending plate 19 reaches the lower end of inclined plate 17 the pointed forward end of the corresponding block 26 rides beneath the lug or projection 28 and into engagement with the head 68 on the inner end of the horizontal arm of bell crank 65, with the result that the free end of said arm will be depressed, thereby moving the shaft 55 and parts carried thereby outwardly against the resistance offered by spring 62, and immediately after block 26 passes head 68 spring 62 will act to force shaft 55 inwardly, thereby engaging against the apricot or peach that has been deposited onto the cutting table 29, and said apricot or peach is thus engaged between the rubber rings 51 and 57 on the inner ends of cups 50 and 56. Inasmuch as shafts 45 and 55 are rotated from the shaft or trunion 22 of the lower drum 21 the engaged apricot or peach will be rapidly rotated for a number of times while in position on the cutting table, and during such rotation it will be engaged by blade 36, which latter is projected upwardly through opening 37 by the action of disc 41 that is carried by shaft 42, and which latter is rotated from shaft 45. Thus, as the blade is elevated it will pass into the body of the apricot or peach engaged between the rotated cups and as said apricot or peach is rotated it will be split or divided on a medial line, and immediately after such operation or when the succeeding block 26 engages the head 64 cup 56 and ring 57 will be withdrawn from the side of the divided apricot and the succeeding plate 19 will carry the divided apricot across the cutting table 29 and the parts of the divided fruit will pass downwardly over inclined plate 32 onto the upper portion of conveyor 71.

It will be understood that the foregoing operations are very rapidly performed and that they take place in proper sequence, and as a result, the machine may be operated so as to handle, within a given period of time, a relatively large quantity of fruit.

My improved fruit splitting machine is comparatively simple in structure, may be economically operated, and is very effective in performing its intended functions.

It will be understood that minor changes in the size, form and construction of the various parts of my improved fruit cutting or splitting machine may be made and substituted for those herein shown and described without departing from the spirit of my invention, the scope of which is set forth in the appended claims.

I claim as my invention:

1. In a fruit cutting machine, a cutting table, means for engaging and rotating the fruit delivered onto said table, and a reciprocatory blade for engaging and splitting the fruit while it is being rotated.

2. In a fruit splitting machine, a pair of oppositely disposed rotatably mounted fruit-engaging members, and a reciprocatory splitting member arranged between said rotatably mounted members.

3. In a fruit splitting machine, a pair of oppositely disposed rotatably mounted fruit-engaging members, a splitting member arranged between said rotatably mounted members, and means for simultaneously rotating said fruit-engaging members and for reciprocating said splitting member.

4. In a fruit splitting machine, a pair of rotatably mounted fruit-engaging members, one of which is movable toward and away from the other member, and a reciprocating splitting member arranged for operation between said rotatably mounted members.

5. In a fruit splitting machine, a pair of rotatably mounted fruit-engaging members, one of which is movable toward and away from the other member, a reciprocating splitting member arranged for operation between said rotatably mounted members, and means for delivering the fruit to be split into position between said rotatably mounted members.

6. In a fruit splitting machine, a table, means for delivering fruit thereonto, means rotatably mounted adjacent to said table for engaging the fruit delivered thereonto, means for moving one of said rotatably mounted fruit-engaging members away from the other, and a reciprocating splitting member arranged for operation through said table between said rotatably mounted fruit-engaging members.

7. In a fruit splitting machine, a table, an endless conveyor for delivering fruit onto said table, a pair of oppositely disposed, rotatably mounted fruit-engaging members arranged to engage the fruit delivered onto said table, means for moving one of said fruit-engaging members away from the other, and means for splitting the fruit while the same is engaged by said rotatably mounted, fruit-engaging members.

8. In a fruit splitting machine, a table, an endless conveyor for delivering fruit onto said table, a pair of oppositely disposed, rotatably mounted fruit-engaging members arranged to engage the fruit delivered onto said table, means for moving one of said fruit-engaging members away from the other, means for splitting the fruit while the same is engaged by said rotatably mounted fruit-engaging members, means for imparting movement to said rotatably mounted fruit-engaging members, and means for reciprocating said fruit splitting means.

In testimony whereof I have signed my name to this specification.

CHARLES F. GARMAN.